(12) United States Patent
Cabuz et al.

(10) Patent No.: US 7,168,675 B2
(45) Date of Patent: Jan. 30, 2007

(54) MEDIA ISOLATED ELECTROSTATICALLY ACTUATED VALVE

(75) Inventors: Eugen I. Cabuz, Eden Prairie, MN (US); Cleopatra Cabuz, Eden Prairie, MN (US); Tzu-Yu Wang, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 255 days.

(21) Appl. No.: 11/018,799

(22) Filed: Dec. 21, 2004

(65) Prior Publication Data

US 2006/0131529 A1 Jun. 22, 2006

(51) Int. Cl.
*F16K 7/04* (2006.01)
(52) U.S. Cl. ............... 251/7; 251/129.01; 251/335.2
(58) Field of Classification Search .............. 251/4, 251/7, 129.01, 129.06, 331, 335.2
See application file for complete search history.

(56) References Cited

U.S. PATENT DOCUMENTS

| | | | |
|---|---|---|---|
| 5,176,358 A | 1/1993 | Bonne et al. | |
| 5,323,999 A | 6/1994 | Bonne et al. | |
| 5,325,880 A * | 7/1994 | Johnson et al. | 251/129.01 |
| 5,441,597 A | 8/1995 | Bonne et al. | |
| 5,452,878 A | 9/1995 | Gravesen et al. | |
| 5,671,905 A | 9/1997 | Hopkins et al. | |
| 5,822,170 A | 10/1998 | Cabuz et al. | |
| 5,836,750 A | 11/1998 | Cabuz | |
| 5,901,939 A | 5/1999 | Cabuz et al. | |
| 5,941,501 A * | 8/1999 | Biegelsen et al. | 251/129.01 |
| 5,971,355 A * | 10/1999 | Biegelsen et al. | 251/129.06 |
| 6,068,751 A * | 5/2000 | Neukermans | 251/7 |
| 6,106,245 A | 8/2000 | Cabuz | |
| 6,179,586 B1 | 1/2001 | Herb et al. | |
| 6,182,941 B1 | 2/2001 | Scheurenbrand et al. | |
| 6,184,607 B1 | 2/2001 | Cabuz et al. | |
| 6,184,608 B1 | 2/2001 | Cabuz et al. | |
| 6,211,580 B1 | 4/2001 | Cabuz et al. | |
| 6,215,221 B1 | 4/2001 | Cabuz et al. | |
| 6,240,944 B1 | 6/2001 | Ohnstein et al. | |
| 6,255,758 B1 | 7/2001 | Cabuz et al. | |
| 6,288,472 B1 | 9/2001 | Cabuz et al. | |
| 6,358,021 B1 | 3/2002 | Cabuz | |
| 6,432,721 B1 | 8/2002 | Zook et al. | |

(Continued)

FOREIGN PATENT DOCUMENTS

DE 10047705 5/2002

*Primary Examiner*—John Bastianelli
(74) *Attorney, Agent, or Firm*—Kris T. Fredrick (57) ABSTRACT

A valve structure having a top part, a flexible media conveyance, such as a tube, a diaphragm and a bottom part with a support for the tube. The top surface of the diaphragm and the bottom surface of the top part may have electrodes attached. When there is no electric potential applied across the electrodes, the diaphragm may rest on and close the passageway in the flexible tube for effectively preventing a fluid flow. When an electrical potential is applied to the electrodes, the diaphragm may be pulled up off from the tube thereby opening or partially opening the passageway in the tube for a media flow or pressure transfer. Partial opening may be for modulation purposes. There may be a tension mechanism attached to the diaphragm. A controller may apply an electrical potential to the electrodes for at least partially opening or closing the valve.

35 Claims, 8 Drawing Sheets

U.S. PATENT DOCUMENTS

| | | |
|---|---|---|
| 6,568,286 B1 | 5/2003 | Cabuz |
| 6,581,899 B2 * | 6/2003 | Williams .................. 251/7 |
| 6,729,856 B2 | 5/2004 | Cabuz et al. |
| 6,750,589 B2 | 6/2004 | Cabuz |
| 6,758,107 B2 | 7/2004 | Cabuz |
| 6,767,190 B2 | 7/2004 | Cabuz et al. |
| 6,837,476 B2 | 1/2005 | Cabuz et al. |
| 2002/0129857 A1 | 9/2002 | Xu et al. |

* cited by examiner

MEDIA ISOLATED ELECTROSTATICALLY ACTUATED VALVE

BACKGROUND

The present invention pertains to valves and particularly to electrostatically actuated valves. More particularly, the invention pertains to electrostatically actuated valves isolated from a media being controlled.

A patent application that may relate to the present invention is U.S. patent application Ser. No. 10/174,851, filed Jun. 19, 2002, which is herein incorporated by reference. Patents that may relate to the present invention include U.S. Pat. No. 6,288,472; U.S. Pat. No. 6,179,586; U.S. Pat. No. 6,106,245; U.S. Pat. No. 5,901,939; U.S. Pat. No. 5,836,750; U.S. Pat. No. 5,822,170; and U.S. Pat. No. 5,323,999; all of which are herein incorporated by reference. This invention may be related to a patent application having attorney docket no. H0003388-0765 (1161.1167101), entitled "Electrostatically Actuated Gas Valve", by Bonne et al., and being filed approximately concurrently, and a patent application having attorney docket no. H0008509-0760 (1100.1314101, entitled "Mesovalve Modulator", by Cabuz et al., all of which are herein incorporated by reference.

SUMMARY

Silicon based electrostatic actuators may use little power and be small but have limitations relative to versatility and cost. The devices (sensors, actuators, and the like) developed under the mesopump technology combine the low power and low cost with the versatility offered by polymer technology. The present invention may combine low cost plastic manufacturing in geometrical configuration capable of operating with very low power an electrostatically actuated valve for controlling fluid flow.

DESCRIPTION

Figure 1:
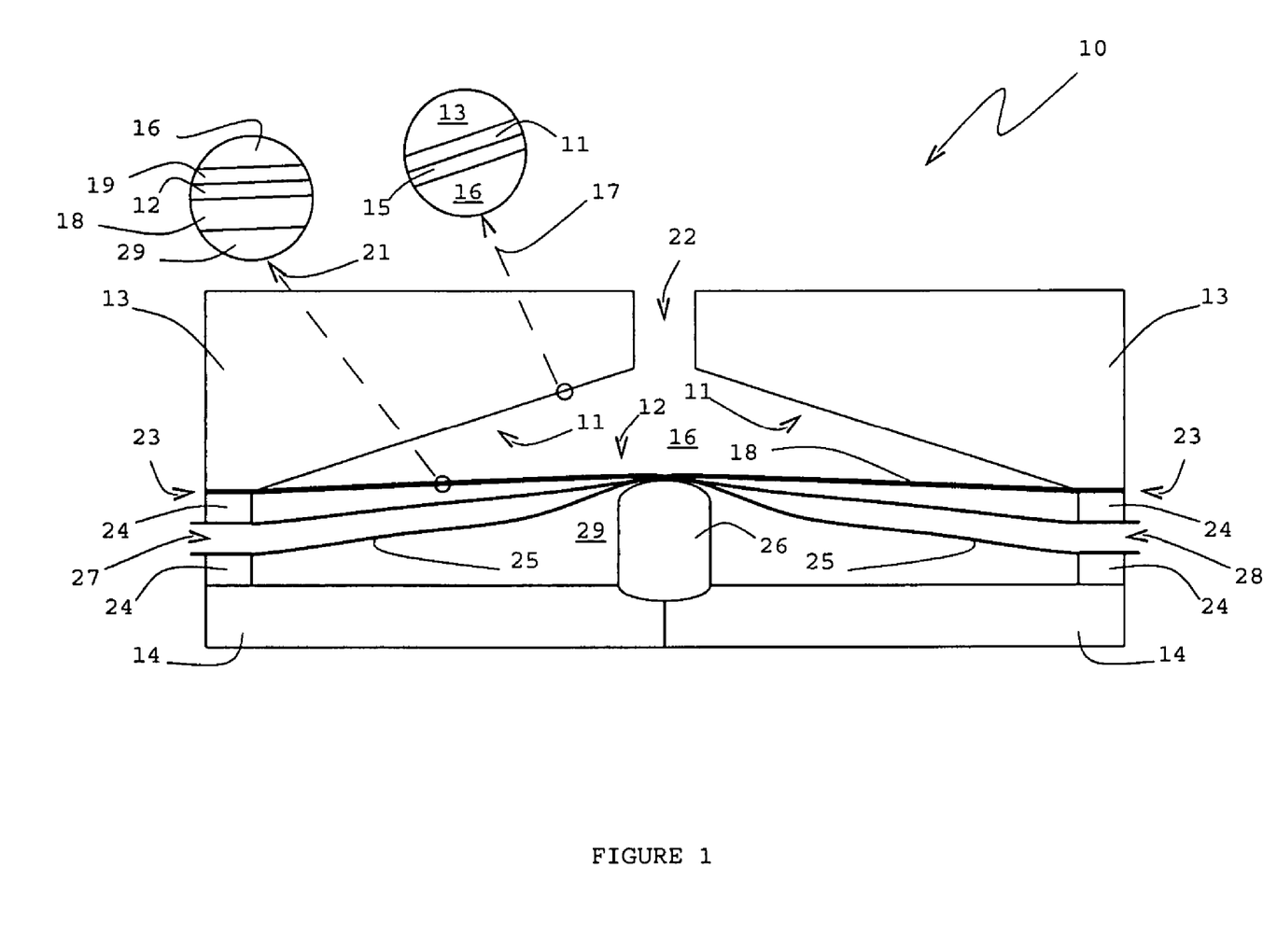
FIG. 1 shows an electrostatically valve for controlling media or fluid isolated from the valve structure which is in a closed position.

In a valve structure 10 of FIG. 1, an electrostatic force may be applied relative to a force that keeps two electrodes 11 and 12 of the valve apart or close. The force keeping the electrodes apart may be of an elastic or pneumatic nature, or the like, such as that of a diaphragm 18. Gravity generally is not a factor. By applying a driving voltage across the electrodes 11 and 12, an electrostatic force may result between the electrodes to change their position relative to each other to affect the valve structure 10. The valve structure may be a micro-structure. The Figures are not necessarily drawn to scale.

A top part 13 and a bottom part 14 of the valve structure 10 may be plastic molded parts. The parts may also be made from other material with various kinds of fabrication techniques. For example, the parts of structure 10 may be fabricated with variants of polymer technology. The top part 13 may have an aluminum (Al) deposition applied to the angled (e.g., 1 to 2 degrees) bottom side of the top part to form the electrode 11 with a dielectric 15 formed on the electrode 11, facing a chamber 16 of the top part 13. The deposition of one or more electrodes may be of another conductive material. The dielectric may be one of several appropriate materials. Examples may include a silicon oxide, silicon nitride, or the like. Other techniques of making the electrodes may be used. A magnification 17 illustrates the layer arrangement incorporating layers 11 and 15 on upper part 13. The electrode 12 may be an aluminum (Al) layer attached to an upper surface of a diaphragm 18. Formed on the electrode or layer 12 may be a dielectric layer 19. Magnification 21 illustrates the layer arrangement incorporating layers 12 and 19 on dielectric 18. Magnifications 17 and 21 are not necessarily drawn to scale. At the top of a chamber 16, at least partially enclosed by part 13 with the surface of electrode 11 and dielectric 15, may be an orifice 22 so that diaphragm 18 may move up (e.g., several tenths of a millimeter) into the chamber 16 without resistance due to a compression of, for example, a gas such as air in the chamber.

The top part 13 and the bottom part 14 may be made from any suitable semi-rigid or rigid material, such as plastic, ceramic, silicon, and the like. In one illustrative example, the parts 13 and 14 may be constructed by molding a high temperature plastic such as ULTEM™ (available from the General Electric Company, Pittsfield, Mass.), CELAZOLE™ (available from the Hoechst-Celanese Corporation, Summit, N.J.), KETRON™ (available from the Polymer Corporation, Reading, Pa.), or some other suitable material. In some examples, the material used for a diaphragm 18 may have elastic, resilient, flexible or other elastomeric properties. In other examples, the diaphragm 18 may be made from a generally compliant material which may be elastically deformed and yet return to its original shape or form when the deforming force or forces are removed. In one example, the diaphragm 18 may be made from a polymer such as KAPTON™ (available from E.I. du Pont de Nemours & Co., Wilmington, Del.), KALADEX™ (available from ICI Films, Wilmington, Del.), MYLAR™ (available from E. I. du Pont de Nemours & Co., Wilmington, Del.), or any other suitable material. An advantage of using a polymer based substrate for a port and/or diaphragm is that the resulting valve may be cheaper and lighter, and/or more suitable for small handheld, or even disposable or reusable applications.

The one or more electrodes 12 of the diaphragm 18 may be provided by patterning a conductive coating on the diaphragm 18. For instance, the one or more electrodes may be formed by printing, plating or an EB deposition of metal. In some cases, the electrode layer may be patterned using a dry film resist. The same or similar techniques may be used to provide the electrode 11 on the inner surface of the upper part 13. Rather than providing a separate electrode layer, the diaphragm 18 and/or inner surface of the upper part 13 may be made conductive so as to operate as an electrode, if desired. A dielectric, such as a low temperature organic and inorganic dielectric, may be used as an insulator between the actuating electrodes 11 and 12. The dielectric may be coated as a layer 19 over the electrode 12 on the diaphragm 18 and as a layer 15 on the electrode 11 on the inner surface of upper part 13. It may be that only one electrode is coated or covered with an insulating dielectric.

The outer circumference of diaphragm 18 may be secured by the connection area 23 of upper part 13 and lower layer 24. The diaphragm 18 may span the breadth of the upper part 13 and lower part 14 components. Diaphragm 18 may have an aluminum deposition on the top side of the diaphragm which operates as an electrode 12. Dielectric 19 may be deposited on the electrode 12.

A perimeter layer or component 24 may be a square- or ring-like, or other shaped interface between upper part 13 and lower part 14, along with the an outer border at the perimeter or circumference of diaphragm 18 inserted in and secured between layer 24 and upper part 13, resulting in chamber 16 above the diaphragm 18 and a cavity or chamber 29 between the bottom surface of lower part 14 and diaphragm 18. Layer 24 may be a portion of lower part 14. In the layer 24 may be a hole or port 27 on one side in which may be inserted an end of an elastic, flexible, pinch-able, constrictable, and/or squeezable media conveyance mechanism 25, such as for instance a tube 25. The other end of tube 25 may be inserted in another hole of layer 24 at the opposite side to be a port 28. Positioned at the center of lower part 14 may be a central pole 26 where tube 25 is situated on and crosses over from one side to the other side of component or layer 24. If the electrodes 11 and 12 are not electrostatically attracting each other, then diaphragm 18 may be resting on tube 25 and squeezing, constricting, or pinching tube 25 in such a fashion so as not to permit a media such as a fluid to flow or pass through tube 25 in one or another direction between ports 27 and 28, resulting in a normally closed valve. The central pole 26 may be slightly higher than the clamping edge of the diaphragm between top structure 13 and layer 24. This difference in height may cause a pre-induced stress in diaphragm 18 which squeezes down the tube closing it off as the valve between port 27 and port 28. The overall height or depth of structure 10 may be one or several millimeters.

Figure 2:
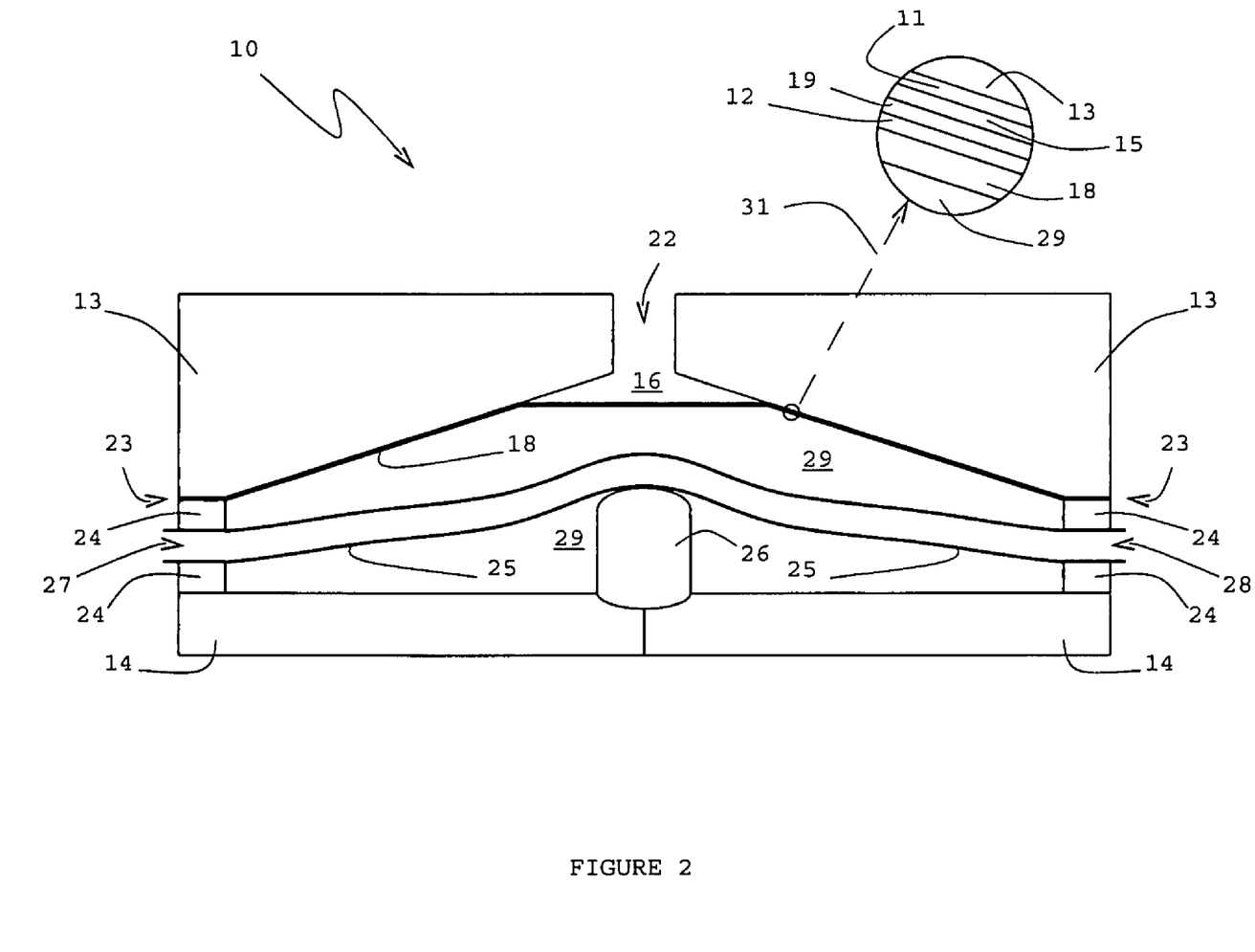
FIG. 2 shows the valve structure of FIG. 1 in a fully open position.
Figure 3:
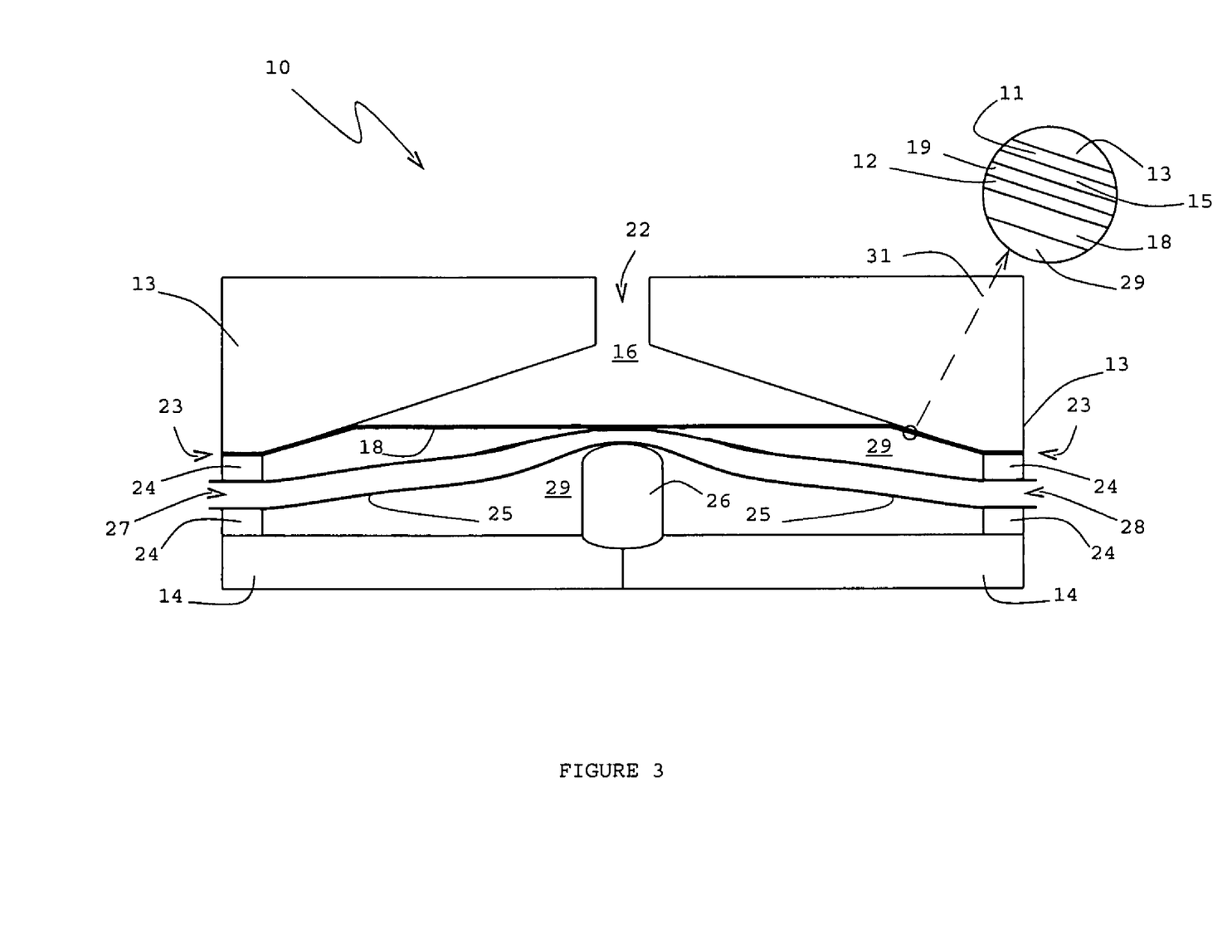
FIG. 3 shows the valve structure of FIG. 1 partially open.

By an application of a voltage to the electrode 11 of the top part 13 and the electrode 12 of the diaphragm 18, the diaphragm may move up and an un-squeezed tube 25 connection between port 27 and port 28 may be opened, as shown in FIG. 2, permitting a media or fluid communication between the ports 27 and 28. The diaphragm 18 with its elasticity may have a large portion of it pulled up against the structure 13. This movement may be regarded as being caused by an electrostatic attraction or force due to opposing polarities of the voltage applied to the electrodes. The energy needed for one actuation may be less than one micro-joule. The fluid that may pass from one port to the other port through tube 25 can be a gas or liquid. The amount of voltage may be less than needed to pull the diaphragm completely off of the tube 25 thereby only partially squeezing the tube to result in a partially closed or open tube, permitting some fluid to flow through at a rate somewhat less than the rate if diaphragm 18 were completely lifted off the tube 25 as shown in FIG. 3. Thus, the flow of a fluid through the valve structure 10 may be varied according to the electrical potential applied across the electrodes 11 and 12.

The valve structure 10 with a variable opening of the fluid conveyance mechanism or tube 25 may permit a modulation of the fluid flow or pressure of the fluid between ports 27 and 28 via the proportionally closeable conveyance mechanism 25 or proportionally squeezable tube 25.

Magnification 31 illustrates the layer arrangement where a portion of diaphragm 18 is up against the upper part 13. Magnification 31 is not necessarily drawn to scale. When the voltage across the electrodes 11 and 12 is removed, the restoring force and/or the pre-induced stress of diaphragm 18 may cause the diaphragm to return to its previous position on the tube 25 thereby completely squeezing or pinching the tube to prevent a flow of fluid through it and thus closing the normally closed valve. The diaphragm 18 may be pushed down with an even greater force, if desired, on the tube 25 against center pole 26 with an electrostatic repelling force of the electrodes 11 and 12 having like polarities.

The diaphragm 18 of structure 10 may have a small leak occur in the closed position because of significant use or of intentional design. For compensating a leaky diaphragm, so as to prevent immobilization because of certain unexpected demands, faults, or other factors, a need for more force may be applied to tube 25. For a high pressure fluid flowing between ports 27 and 28, diaphragm 18 may need an additional closing force. A repelling force between the electrodes 11 and 12 may be an alternative force. An additional closing force may be accomplished with a tension-providing mechanism 32, for example, a spring, which may supply an expanding tension between structure 13 and diaphragm 18, thereby forcing the diaphragm 18 against the fluid conveyance mechanism 25 to more effectively control the flow of a fluid.

The tension mechanism 32 may instead provide a contracting tension tending to pull up the diaphragm 18 where away from conveyance 25. A repelling electrostatic force between electrodes 11 and 12 may be used. The contracting tension may provide lighter tension of diaphragm 18 upon tube 25 as desired.

Figure 4:
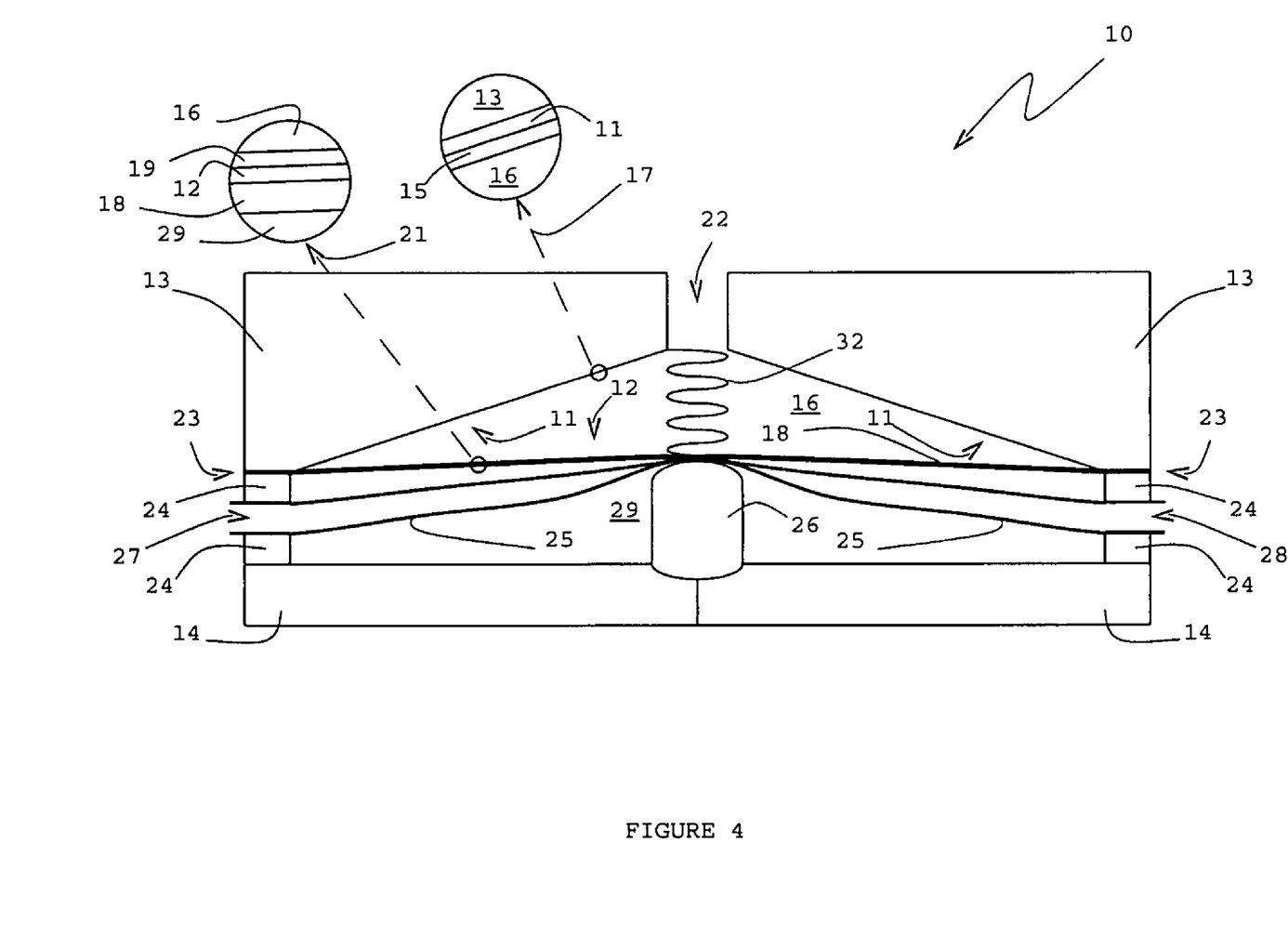
FIG. 4 shows the valve structure having a tension mechanism relative to the valve in a closed position.
Figure 5:
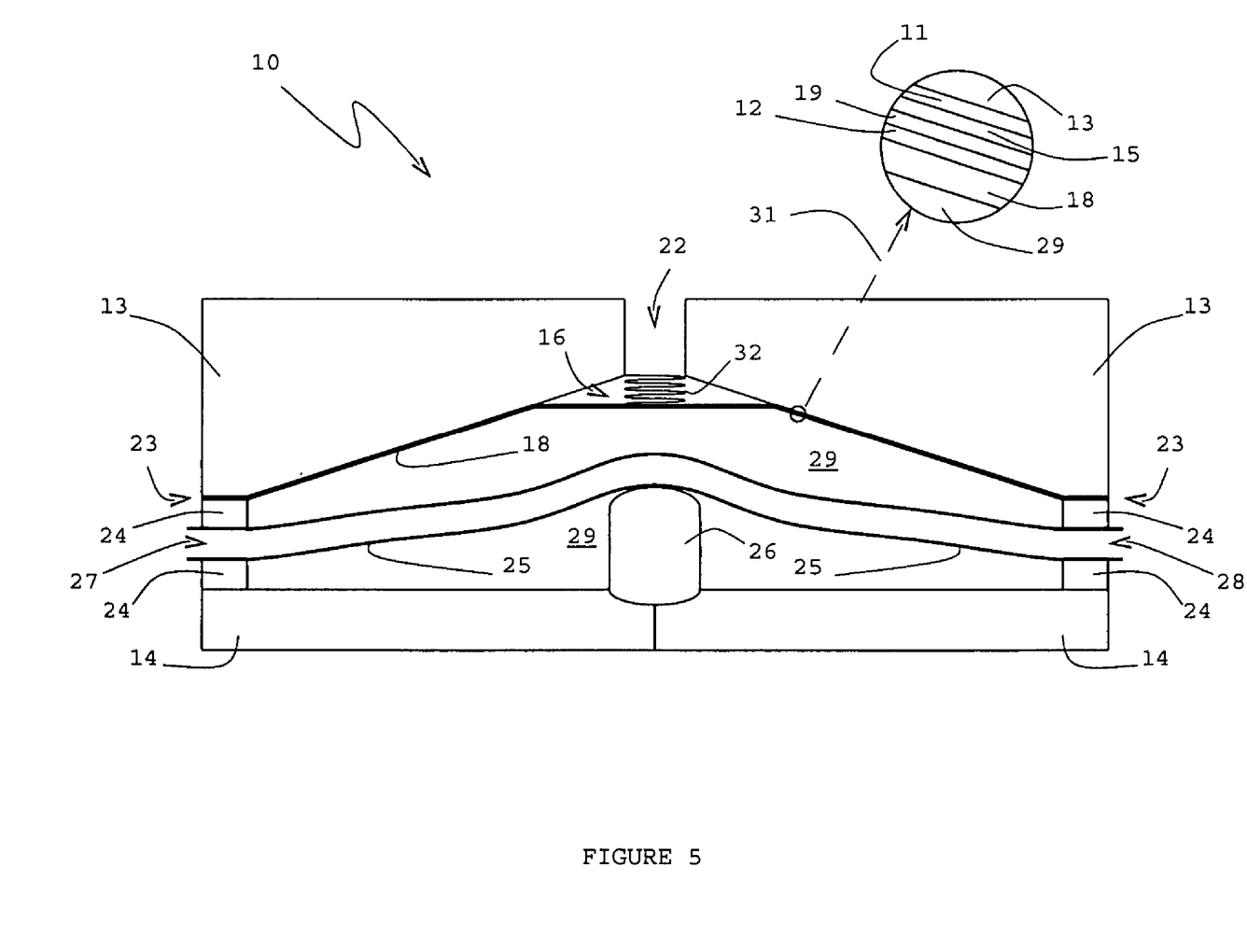
FIG. 5 shows the valve structure having a tension mechanism relative to the valve in an open position
Figure 6:
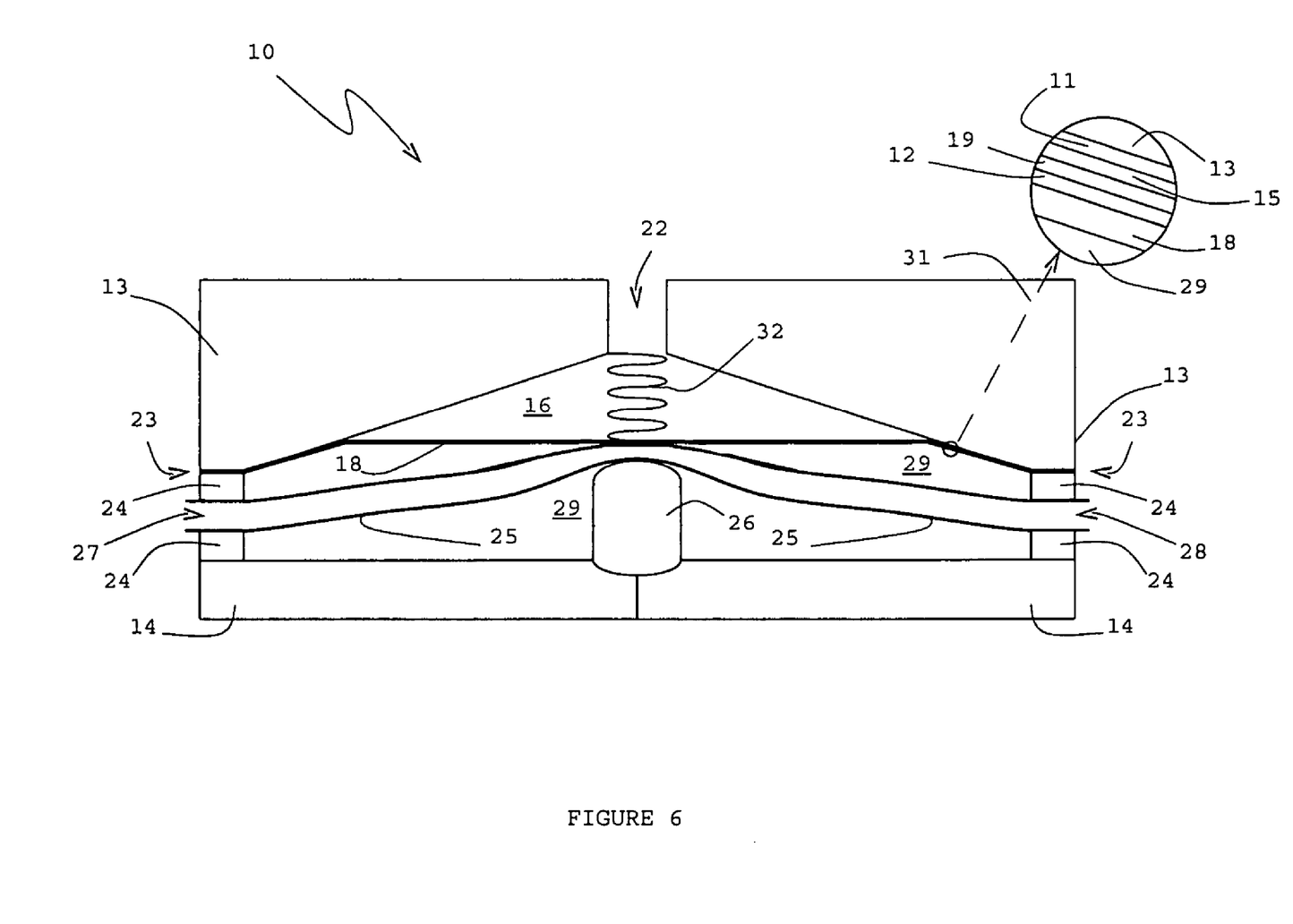
FIG. 6 shows the valve structure having a tension mechanism relative to the valve in a partially closed or open position.

The tension-providing mechanism may be attached to or situated between or on structure 13 and membrane 18 to provide the added tension of one kind or another. FIG. 4 shows the closed valve structure 10 with the tension-providing mechanism 32. FIGS. 5 and 6 show the open, and the partially open or partially closed valve structure 10, respectively, which may incorporate a tension mechanism 32, such as a spring.

Figure 7A:
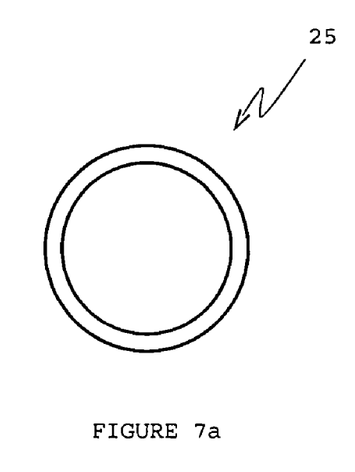
FIG. 7a is a cross-section of a circular closeable tube that may be in the valve structure.
Figure 7B:
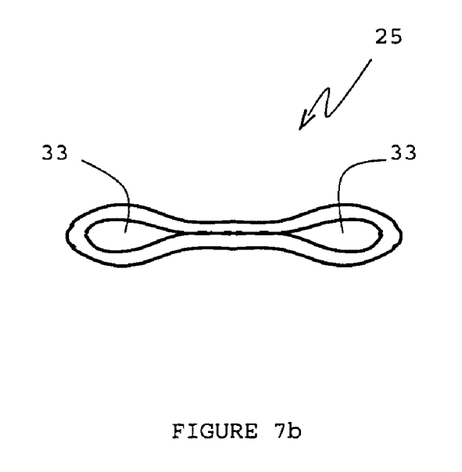
FIG. 7b shows the cross-section of the tube of FIG. 7a in closed or semi-closed state.

FIG. 7a shows a cross-section of a circular tube that may be used as a fluid conveyance mechanism 25 in the valve structure 10. FIG. 7b shows a cross-section of the closure of the tube. When this tube is maximally closed or squeezed, there may still be some fluid flow or pressure transfer in areas 33 of the squeezed tube. Areas 33 may be exaggerated in relative size in FIG. 7b for illustrative purposes. A residual flow or pressure transfer through areas 33 may be desired in some applications.

Figure 8A:
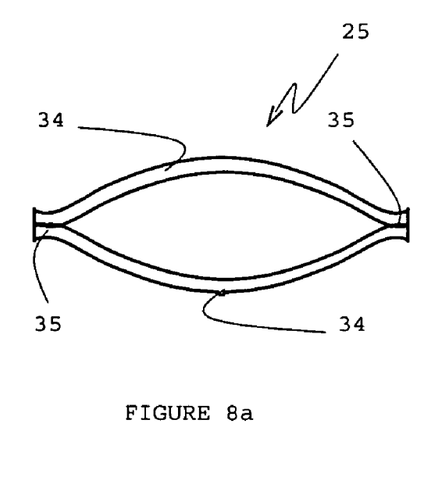
FIG. 8a is a cross-section of an oblong closeable tube that may be used in the valve structure.
Figure 8B:
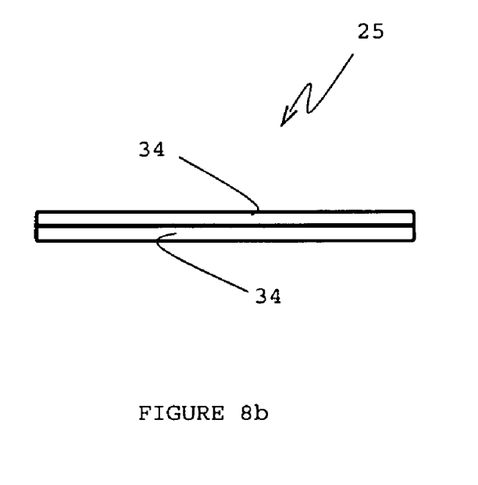
FIG. 8b shows the cross-section of the tube of FIG. 8a in a closed state.
Figure 9:
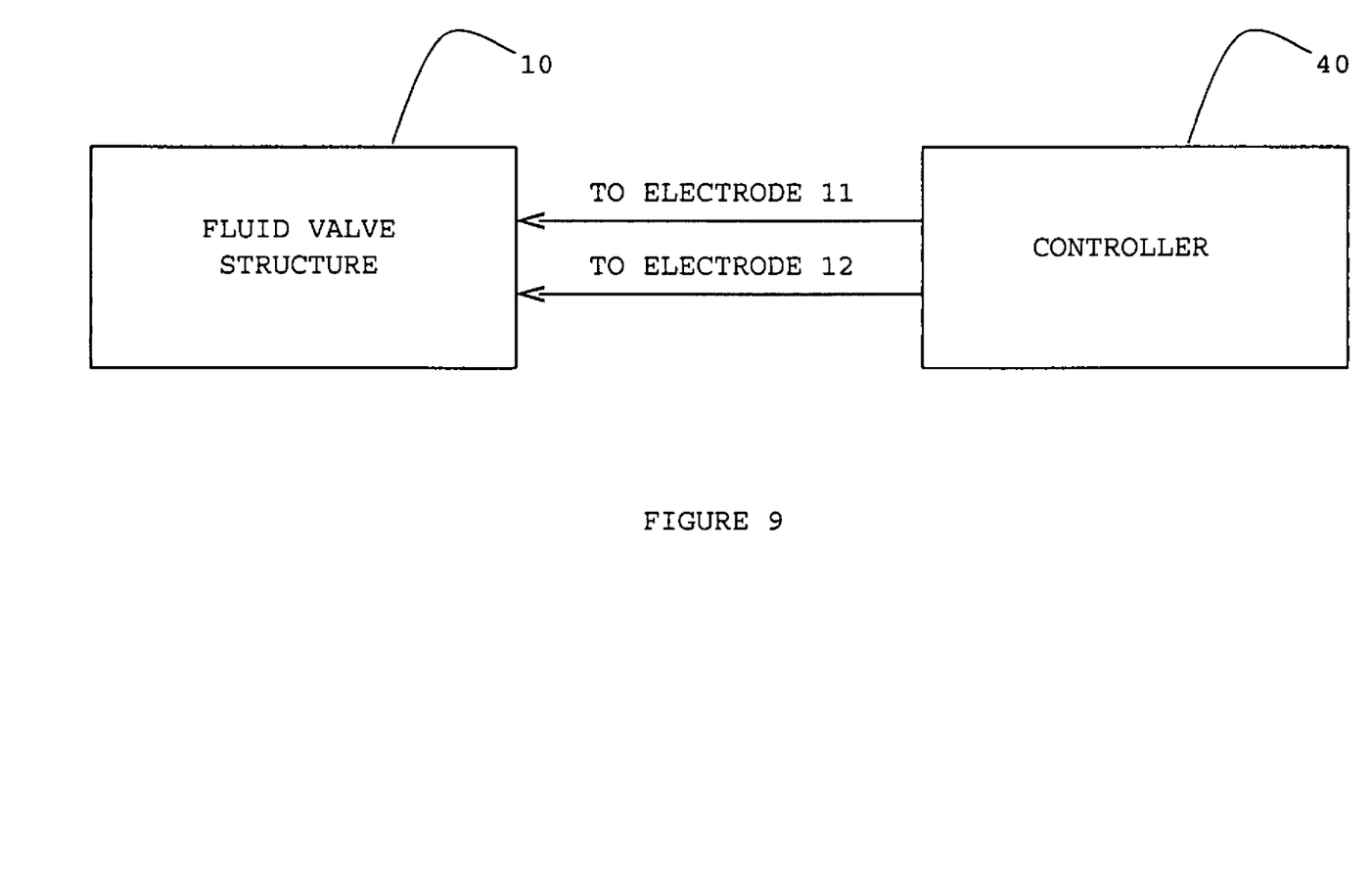
FIG. 9 shows a controller and its connection to the valve structure.

FIG. 8a reveals a cross-section view of another tube configuration that may be used as a fluid conveyance mechanism 25 in valve structure 10. This tube 25 may have two layers 34 of flexible material attached, sealed or molded together at apparent seams 35. FIG. 8b shows a cross-section of the closure of the tube in FIG. 8a. When this tube is maximally closed or squeezed, there generally is no open area for residual flow or pressure transfer of fluid as may be the case for the tube shown in FIG. 7b. Various other kinds of tubes, and fluid or pressure conveyance mechanisms 25 may be implemented in the valve structure 10.

Valve structure 10 may have its electrodes connected to a controller 40 for control of the valve in the structure via application of a voltage to the electrodes 11 and 12. The polarities, magnitudes, and timing of the voltages may be determined, indicated and/or provided by the controller 40. Programming and/or software may be implemented for control of structure 10 by controller 40. The rate of fluid flow through the valve structure 10 may be effected by the controller 40 via the electrical potential to the electrodes 11 and 12. The controller 40 along with the variable flow rate approach of the valve structure may be used for various applications such as flow or pressure modulation or control, and the like. Signals provided to the electrodes may be analog having voltages of various magnitudes, or the signals may be digital having voltages of a constant magnitude sufficient to open the valve (i.e., the tube) rather completely, or no magnitude to close the valve rather completely. The format of the signals may be converted from digital to analog and/or from analog to digital. An interface of the controller 40 with the valve structure 10 is shown in FIG. 3. The structure 10 may be easily designed to meet various applications such as, for example, use in a disposable cartridge for a micro-cytometer or other devices. Structure 10 may also be incorporated in MEMS devices and the like.

In the present specification, some of the material may be of a hypothetical or simulated nature though not necessarily indicated as such.

Although the invention is described with respect to at least one illustrative embodiment, many variations and modifications will become apparent to those skilled in the art upon reading the present specification. It is therefore the intention that the appended claims be interpreted as broadly as possible in view of the prior art to include all such variations and modifications.

What is claimed is:

1. An electrostatic valve comprising:
   a bottom structure;
   a top structure situated on the bottom structure;
   a diaphragm situated between the bottom structure and the top structure;
   a squeezable conveyance structure situated between the bottom structure and the diaphragm;
   a first electrical conductor attached to the diaphragm; and
   a second electrical conductor attached to the top structure.

2. The valve of claim 1, wherein the diaphragm has a plurality of states ranging from closing to opening the conveyance structure.

3. The valve of claim 2, wherein:
   a sufficient electrical potential across the first and second conductors results in the diaphragm being in one of the states; and
   a lack of sufficient electrical potential across the first and second conductors results in the diaphragm being in another state.

4. The valve of claim 3, wherein some of the plurality of states are modulating states.

5. The valve of claim 3, wherein the bottom structure, the top structure, the diaphragm, and/or the conveyance structure is fabricated with polymer technology.

6. The valve of claim 5, wherein the conveyance structure is a flexible tube.

7. The valve of claim 6, wherein the flexible tube has ports which are accessible externally of the valve.

8. The valve of claim 7, wherein:
   the first conductor is a layer of metal on the diaphragm; and
   the second conductor is a layer of metal on an inside surface of the top structure.

9. The valve of claim 8, wherein a dielectric coating is on at least one of the first and second conductors.

10. The valve of claim 9, wherein the bottom structure and the top structure are plastic parts.

11. The valve of claim 10, wherein a controller is connected to the first and second conductors.

12. The valve of claim 3, further comprising a tension mechanism attached to the diaphragm.

13. A valve structure comprising:
    a base;
    a perimeter layer situated on the base;
    a diaphragm situated on the perimeter layer;
    a chamber structure situated on a perimeter of the diaphragm;
    a first electrode attached to the chamber structure;
    a second electrode attached to the diaphragm; and
    a tube situated between the base and the diaphragm.

14. The structure of claim 13, wherein:
    the diaphragm has a first position and a second position;
    the diaphragm closes off the tube in the first position; and
    the diaphragm at least partially opens up the tube in the second position.

15. The structure of claim 14, wherein:
    applying a voltage across the first and second electrodes causes the diaphragm to move to the second position; and
    removing the voltage from across the first and second electrodes causes the diaphragm to move to the first position.

16. The structure of claim 15, further comprising:
    an obstruction situated on the base proximate to the tube; and
    wherein the diaphragm in the first position closes the tube with a force that pushes the tube against the obstruction due to a pre-induced stress as the clamped edge of the diaphragm between the perimeter layer and the chamber structure, overlaps the distance of the obstruction from the base.

17. The structure of claim 16, further comprising a tension mechanism connected to the diaphragm.

18. The structure of claim 16, wherein the chamber structure has an orifice.

19. The structure of claim 18, wherein the tube connects a first port at an outer edge of the perimeter layer with a second port at the outer edge of the perimeter layer.

20. The structure of claim 19, wherein:
    the first electrode is a first conductive coating on an inside surface of the chamber structure; and
    the second electrode is a second conductive coating on the diaphragm.

21. The structure of claim 20, further comprising a dielectric layer formed on at least one of the first and second conductive coatings.

22. The structure of claim 21, wherein the base, the chamber structure, the perimeter structure, and/or the diaphragm is fabricated with polymer technology.

23. The structure of claim 15, further comprising a controller connected to the electrodes.

24. A fluid control device comprising:
    a first part having a base, a perimeter wall having a first port and a second port, and a support structure situated on the base;
    a tube at least partially situated on the support structure, and having a first end connected to the first port and a second end connected to the second port;

a diaphragm situated on the perimeter wall and covering an area within the perimeter wall;

a second part situated on the diaphragm in a vicinity of the perimeter wall and having a cavity in an area within the perimeter wall;

a first electrode attached to the diaphragm; and a second electrode attached to an inside surface of the cavity.

25. The device of claim 24, wherein:

the diaphragm constricting the tube at least partially is a first position of the diaphragm; and the diaphragm not constricting the tube is a second position of the diaphragm.

26. The device of claim 25, wherein:

an application of an electrical potential across the first and second electrodes causes the diaphragm to be in a second position; and a partial or no application of the electrical potential across the first and second electrodes causes the diaphragm to be in a first position.

27. The device of claim 26, further comprising a controller connected to the first and second electrodes.

28. The device of claim 26, wherein the first part, the second part and the diaphragm are fabricated from polymer technology.

29. The device of claim 28, wherein the first and second parts are plastic parts.

30. The device of claim 26, wherein at least one of the first and second electrodes is coated with a dielectric material.

31. An electrostatic actuated valve comprising:

a bottom part having a ridge at a perimeter;

a post situated on the bottom part;

a squeezable tube situated on the post having a first end at the ridge for external access and a second end at the ridge for external access;

a diaphragm over the bottom part having an edge at the ridge;

a top part having a ridge that clamps the edge of the diaphragm;

a first electrode attached to the diaphragm; and a second electrode attached to a bottom side of the top part.

32. The valve of claim 31, wherein:

the post is beyond the edge of the diaphragm; and the diaphragm normally pushes on the tube thereby closing the way between the first end and the second end.

33. The valve of claim 32, wherein an application of a voltage across the first electrode and the second electrode lifts the diaphragm off the tube thereby at least partially opening the way between the first end and the second end.

34. The valve of claim 33, wherein a deposition of dielectric material is on at least one of the first and second electrodes.

35. The valve of claim 34, wherein:

the top part and the bottom part are plastic molded parts; and the tube comprises a plastic.

* * * * *